J. PLAYER.
LOCOMOTIVE SPARK EXTINGUISHER.
APPLICATION FILED FEB. 14, 1910.

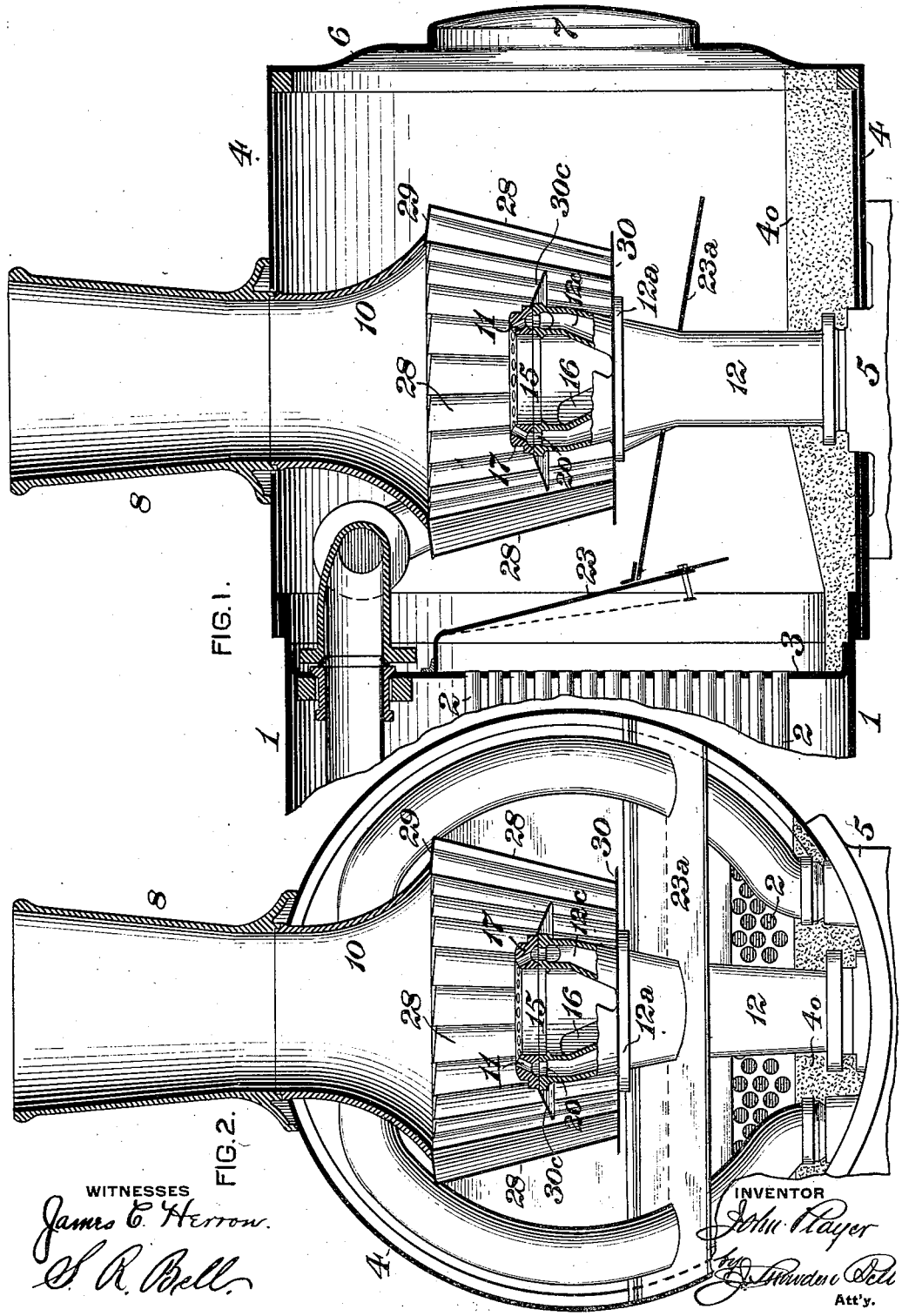

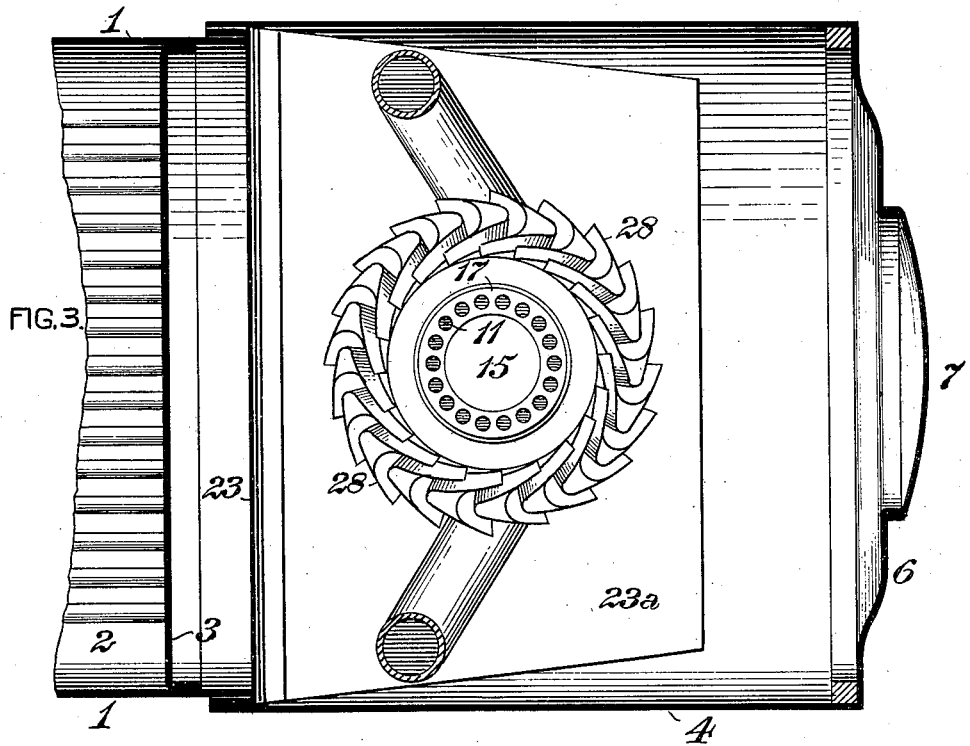
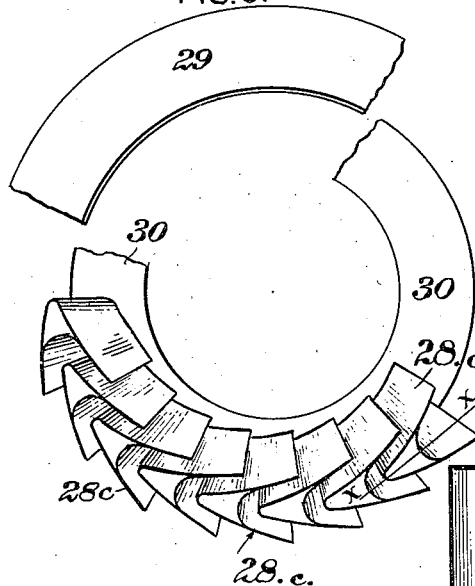
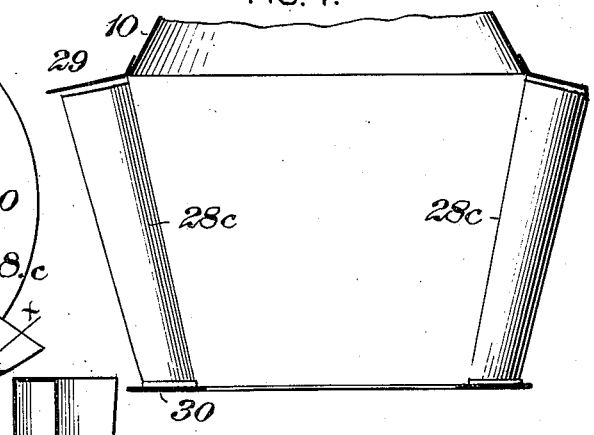

1,070,174. Patented Aug. 12, 1913.
5 SHEETS—SHEET 3.

WITNESSES
James E. Herron.
S. R. Bell.

INVENTOR
John Player.
By Swanden Bell
Att'y.

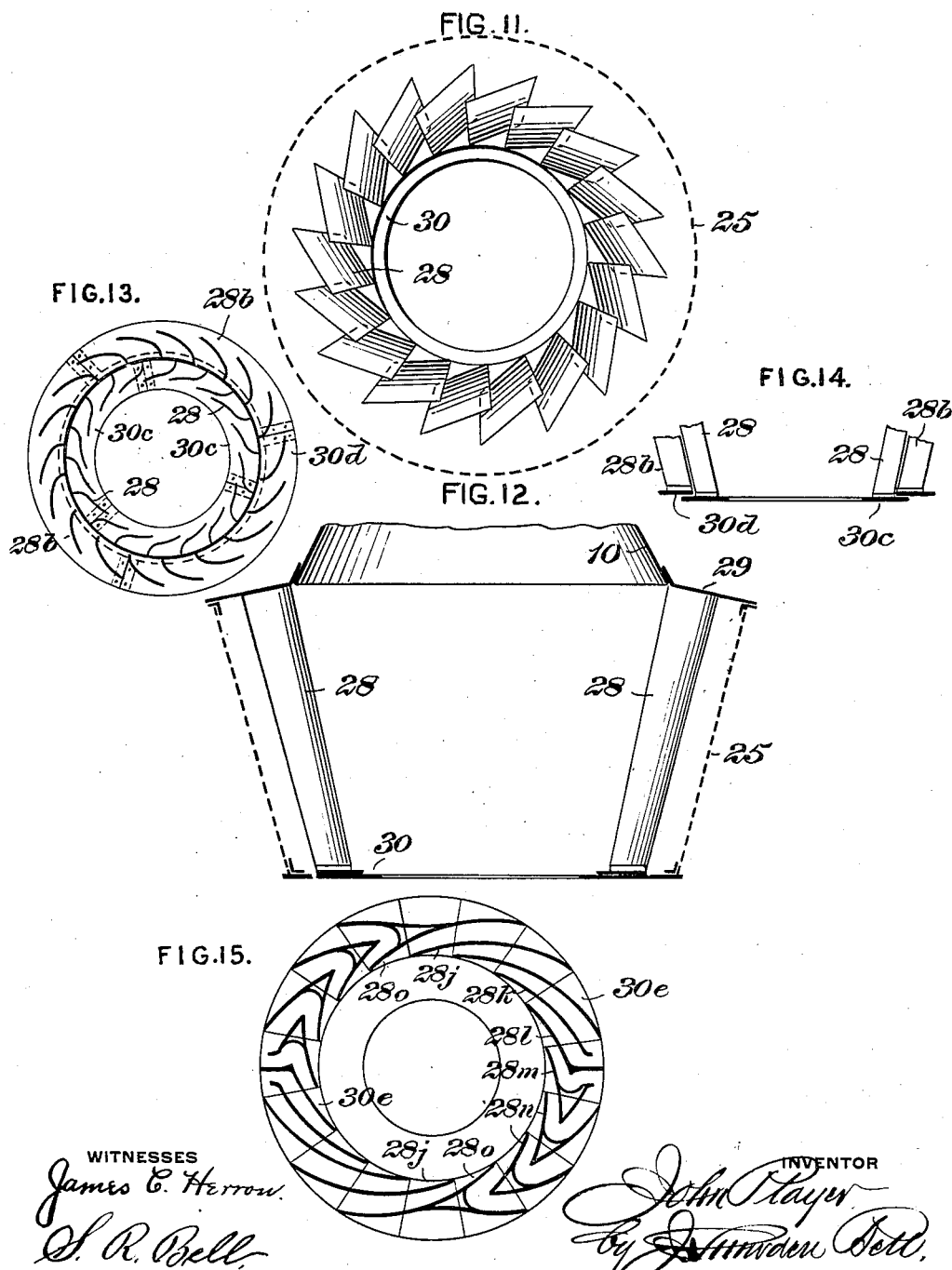

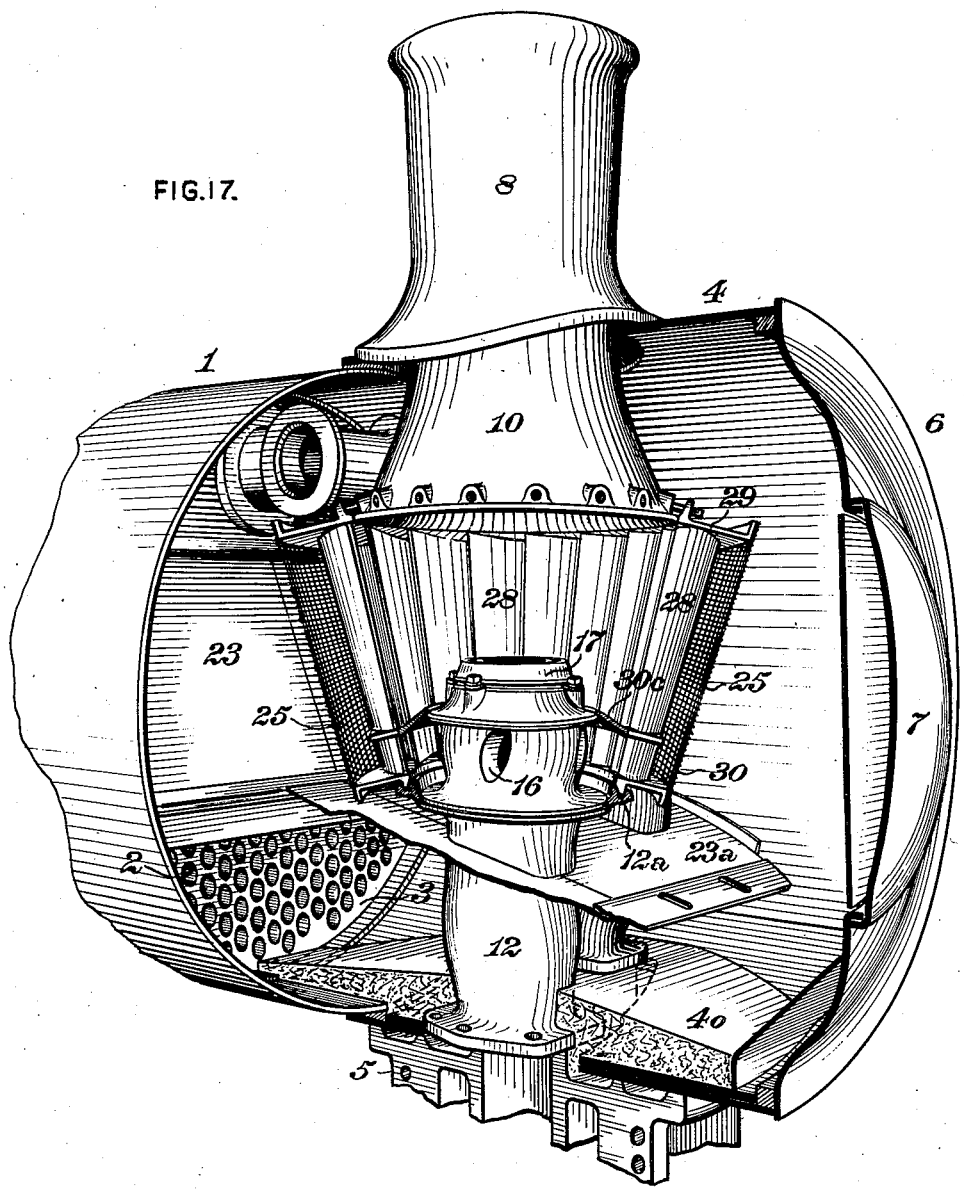

UNITED STATES PATENT OFFICE.

JOHN PLAYER, OF SCHENECTADY, NEW YORK.

LOCOMOTIVE SPARK-EXTINGUISHER.

1,070,174.   Specification of Letters Patent.   Patented Aug. 12, 1913.

Application filed February 14, 1910. Serial No. 543,717.

*To all whom it may concern:*

Be it known that I, JOHN PLAYER, of Schenectady, in the county of Schenectady and State of New York, have invented a certain new and useful Improvement in Locomotive Spark - Extinguishers, of which improvement the following is a specification.

My invention relates to spark extinguishers for locomotive or other engines in which the draft upon the fire is created by the vacuum induced by a steam blast jet acting in the smoke stack, by which a gyrating motion will be imparted to the gaseous and solid products of combustion, prior to and during their traverse through an open smoke stack, and in which the solid products of combustion will, by the centrifugal force induced in their gyration, be thrown outward, and spirally rotated therein and entirely extinguished before they are ejected from the stack by the action of the blast jet.

A spark extinguishing appliance of the character above noted is set forth in Letters Patent of the United States No. 951,994, granted to me March 15, 1910, and the object of my present invention is to provide structural features of improvement capable of meeting special requirements and modifications in design of locomotive smoke boxes, of older and different designs, in connection with which, among others, my invention may be applied, in order to enable it to effectively perform the same functions under various conditions.

The improvement claimed is hereinafter fully set forth.

Figure 6:
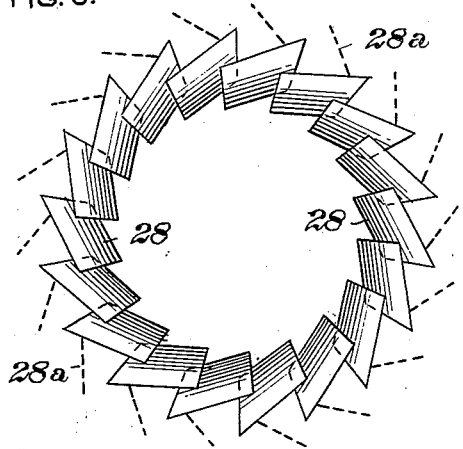
Figure 8:
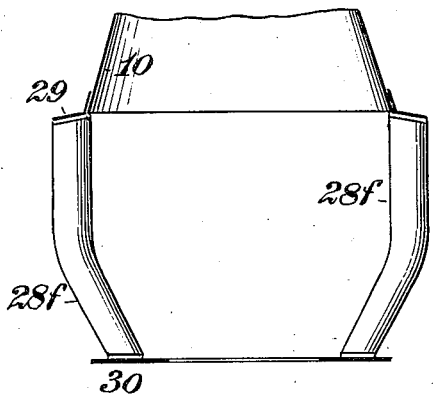
Figure 7:
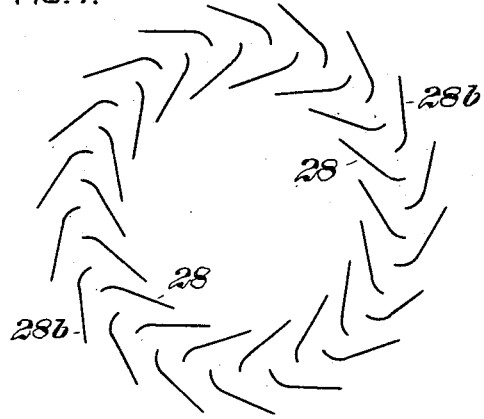
Figure 9:
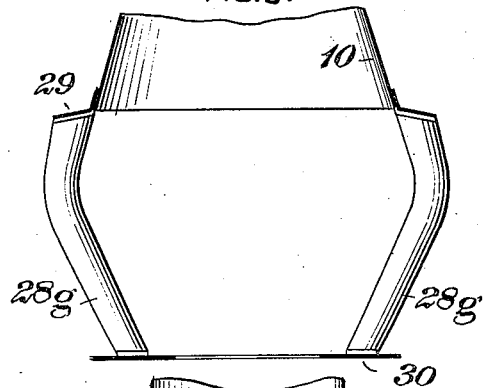
Figure 16:
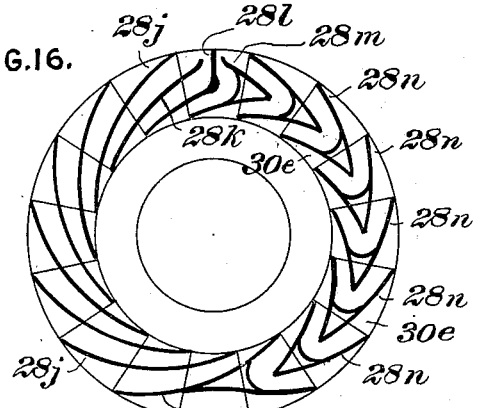
Figure 10:
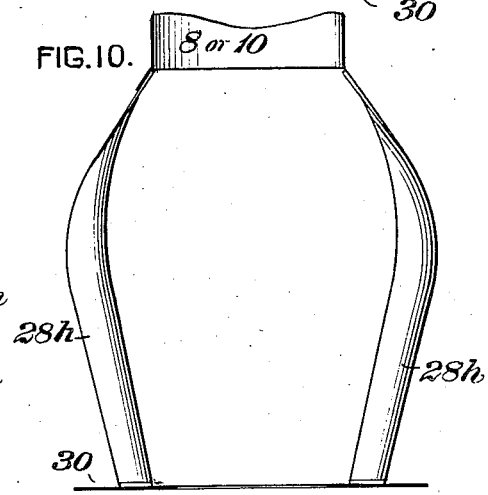

In the accompanying drawings: Figure 1 is a vertical longitudinal central section through the smoke box and stack of a locomotive boiler, illustrating an application of my invention; Fig. 2, a vertical transverse section in the central plane of the exhaust pipe and stack; Fig. 3, a horizontal section through the "gyrus," taken below the extension of the stack; Fig. 4, a vertical central section, on an enlarged scale through the "gyrus"; Fig. 4ª, a central vertical section through one of the vanes, 28ᶜ, shown in Fig. 4, on the line $x$ $x$ of Fig. 5; Fig. 5, a plan of the "gyrus," with portion of the upper and lower supporting rings broken away, and a number of the vanes detached; Fig. 6, a horizontal section through a "gyrus," showing the application of deflectors to the vanes; Fig. 7, a horizontal section through a "gyrus," showing the vanes supplemented by oppositely disposed deflectors constituting a secondary "gyrus"; Fig. 8, a vertical central section through a "gyrus" having vanes of different vertical form; Fig. 9, a similar section through a "gyrus" having vanes vertically incurved at their upper extremities; Fig. 10, a similar section through a "gyrus" having vanes vertically incurved and with gradually reduced openings between them at their upper extremities; Fig. 11, a horizontal section through a "gyrus" having vanes surrounded by a screen of foraminous material; Fig. 12, a vertical central section through a "gyrus" having a conical screen of foraminous material surrounding the vanes; Fig. 13, a sectional plan showing a modification of the construction illustrated in Fig. 7, having the secondary gyrus adjustable circumferentially; Fig. 14, a vertical section through the lower portion of the structure shown in Fig. 13; Fig. 15, a sectional plan, illustrating a disposition of gyrus vanes adaptable to very short smoke boxes; Fig. 16, a similar view, showing a modification of the construction illustrated in Fig. 15, suitable for smoke boxes which are very short at one end of the gyrus and long at the other end, and; Fig. 17, a section in perspective, through the smoke box of a locomotive, showing an application of my invention.

Referring to the drawings, my invention is herein exemplified as applied in connection with the smoke box of a locomotive boiler of one of the standard types, and with an exhaust pipe and nozzle of the construction set forth in Letters Patent No. 948,020 granted to me February 1, 1910. My present invention relating, as before stated, to structural features of improvement on that of Letters Patent No. 951,994 aforesaid and being similar thereto in its generic and fundamental principle, said structural features of improvement only will be herein fully and in detail described.

The shell or waist, 1, of the boiler, is provided with a plurality of fire tubes, 2, extending from the firebox, which is not shown, to the front tube sheet, 3, through which tubes the products of combustion pass from the firebox to the smoke box, 4, which is secured, at its rear end, to the front ring of the shell, 1, and, at its bottom, to the cylinder saddles, 5. The forward end of the smoke box is closed by a metal front, 6, having a door, 7, and it is provided, at its top, with a stack, 8, having a downward extension or "penetration," 10, with a flaring or conical lower end, of comparatively large diameter, within the smoke box.

The exhaust pipe, 12, and annular exhaust nozzle, 17, herein illustrated, accord, in all substantial particulars, with the corresponding parts set forth in Letters Patent No. 948,020 aforesaid. The exhaust pipe, 12, is provided with exhaust steam passages, 12°, leading into an annular passage, 20, in the nozzle, from which the exhaust steam is discharged through a plurality of passages, 11, and a portion of the gases of combustion is drawn, by the vacuum produced by the exhaust jet, through entrainment passages, 16, in the exhaust pipe, and discharged therefrom through a central gas discharge passage, 15.

A smoke box deflector plate, 23, extends downwardly and forwardly, in advance of the front tube sheet, 3, and is provided with a forward extension, 23ª, forming a "table plate", which may be varied as to position, inclination, and length, to properly regulate the currents of the products of combustion.

The elements above enumerated do not, in and of themselves, constitute part of my present invention, and may, to a greater or less extent, be used as shown, modified structurally, or omitted, in the discretion of the constructor familiar with locomotive engine practice.

The "gyrus", which may, within my invention, be of varying forms, differing structurally from those shown in the accompanying drawings and hereinafter described, is concentric with respect to the exhaust nozzle, and comprises a circumferential series of nested vanes, upwardly flared, in inverted frusto-conical form, said vanes being incurvate and recurvate along reversely converging spirals, forming passages therethrough, by which the gases are discharged, within the gyrus, tangentially to different circles in the same horizontal plane, and to different circles in superposed planes, the circles increasing in diameter from the lower to the upper portions of the gyrus, and all being eccentric to the axis thereof.

The function of the separator plate, 30°, is that of separating the products of combustion inferior thereto and destined for entrance through the entrainment openings of the exhaust pipe, from those superior thereto, destined for gyration within the upper portion of the gyrus, and thereby maintaining uniform and respectively correct vacuum within the different portions of the gyrus.

As indicated in the several horizontal sectional views, the vanes are, except in Figs. 6 and 11, shown with curved surfaces, disposed in consecutive spiral form having the direction of their respective surfaces in any horizontal section through the frusto-conical structure, tangential to arcs of circles eccentrically centered in the same horizontal plane with respect to the axis of the gyrus, in order to further protract the travel either directly or by effecting a reversal of the currents of the products of combustion between the exterior and interior of the gyrus. The vanes of the gyrus may be, as also shown, supplemented by an exterior ring of deflectors constituting a secondary "gyrus", which deflectors may be either solid or foraminous plates. In the former case, they act to effect a reversal of the currents of the products of combustion, and, in the latter, they additionally serve to disintegrate the solid products of combustion. They may likewise be supplemented by surrounding foraminous screens. The vanes may be made of plates as shown, attached to the upper and lower rings of the gyrus, or of cast metal, and be either in series, or each independent, with the respective segments of the upper and lower rings cast integral with them, or the inner and outer portions of each vane may be made separately, and butted, lapped, or jointed together in such manner as to form a complete vane or set of vanes. Further, instead of the outer and inner portions of each vane being both made solid, the inner portion may be made solid, and the outer portion may be partially or entirely foraminous.

As shown in Figs. 4, 4ª, and 5, the gyrus is provided with vanes, 28°, the inner and outer portions of which are respectively reversely disposed incurvately, being recurvately united and having the horizontal directions of said inner and outer portions approximately tangential to opposed circular arcs eccentrically centered with respect to the axis of the gyrus. Each of the vanes may be either constructed of spaced plates of metal or formed integral, as preferred, and they are approximately of such contour that, when assembled in the "gyrus", they form passages gradually decreasing in horizontal area from the exterior to the interior thereof, as clearly indicated in Fig. 5, the vanes being approximately V shaped in horizontal section, and, when assembled, forming an inverted frusto-conical "gyrus", having incurvate-recurvate passages therethrough, the outer portions of which are approximately incurvate spirals, these being recurvated to the inner portions, which are likewise approximately incurvate spirals, but of opposite directions to the outer portions, the effective horizontal area of said passages being maintained by constructing the inner recurved surfaces of the vanes of greater radius than the outer.

Fig. 6 shows the gyrus vanes, 28, as supplemented by oppositely disposed deflectors, 28ª, which may be either of foraminous material, constituting screens, or be solid plates. These deflectors, when made of foraminous material and set at suitable angles, will enable the larger particles of the solid products of combustion, during their traverse exterior to the gyrus, to strike against them and become disintegrated, or to be deflected from them, while the gaseous products and finer solid particles will be entrained through the screens and between the vanes. If the deflectors, $28^a$, are solid, they will act only as deflectors, and induce a reversal of the currents of the products of combustion, in passing between them, thus causing the larger particles of the solid products of combustion to impinge against the vanes, and become disintegrated, prior to their entrainment within the gyrus.

As shown in Fig. 7, the gyrus vanes, 28, are supplemented by exterior oppositely disposed deflectors, $28^b$, separated therefrom, effecting a reversal of the currents of the products of combustion between the exterior and the interior of the gyrus. The vanes are made solid, but the deflectors may be either solid or wholly or partially foraminous, as preferred, according to requirements. The vanes and deflectors may be either both attached to the same upper and lower supporting rings or frames, or be cast sectionally, integral with their corresponding segments, which may be either fixed in position or made revoluble circumferentially, with relation to the vanes, so that the relative openings between the vanes and deflectors may be adjusted as desired, as shown in Figs. 13 and 14, the vanes, 28, being attached, at the bottom, to a lower supporting ring, 30, and, at the top, to a similar ring, or be cast sectionally and integral with their respective segments, while the deflectors, $28^b$, are attached, at the bottom, to a ring, $30^d$, and, at the top, to a similar ring, or be cast sectionally and integral with their respective segments, and made revoluble and adjustable circumferentially, relatively to the interior vanes, 28. The interior vanes may, in like manner, be made revoluble and adjustable relatively to fixed interior deflectors.

In smoke boxes of older design, in which the available space, both in front and in rear of the gyrus, is shorter than is desirable to obtain the best results with a gyrus of any of the forms hereinbefore described, and in which it is not practicable to obtain proper circulation of the products of combustion exterior to the gyrus, the arrangement of the gyrus vanes may be modified as shown in Fig. 15, in which the gyrus is composed of vanes of varying form, so disposed that the products of combustion will be entrained between the vanes, at its exterior, on the two sides of the gyrus, and be deflected thereby in such manner as to cause uniform rotation or gyration within the interior thereof, as in the instances before described. To this end, two of the vanes, $28^l$, are formed with outer portions, which are located in the transverse axial plane of the gyrus, and with incurvate inner portions. The vanes, $28^k$, next to the convex sides of the vanes, $28^l$, are incurvated from short reverse curves at their outer edges. Incurvated vanes, $28^j$, are located next succeeding the vanes, $28^k$, on the convex sides thereof, and vanes, $28^m$, $28^n$, $28^o$, of incurvate recurvate section, are disposed between the vanes, $28^j$ and $28^l$. The vanes are preferably cast in segments, having integral bottom segments of flanges or supporting rings, $30^e$, and similar segments at top. The vane segments and their flanges are so designed and assembled that only three or four patterns are required for a complete gyrus.

In smoke boxes which are disproportionate in length in front of and at the rear of the gyrus, a modified form of the construction last described may be used with advantage, the same being shown in Fig. 16. The vanes, are, in this case, of substantially the same several forms as shown in Fig. 15, but are slightly differently disposed, there being but one vane, $28^l$, the outer portion of which is, instead of as in the preceding case, located in the longitudinal axial plane of the gyrus, and but one set of vanes, $28^j$ and $28^k$, and one set of incurvate recurvate vanes. Under this construction, the products of combustion will be entrained, at its exterior, on the two sides of the gyrus, through the openings between the vanes, $28^j$, and between the vanes, $28^n$, respectively, and, at the front or back of the gyrus, as desired, through the openings between the vanes, $28^k$, $28^l$, and, $28^m$, and be thereby deflected so as to cause uniform rotation or gyration within the gyrus, as in the instances before described.

Although it has been determined, by prolonged tests in severe service, that the gyrus, when applied to locomotive smoke boxes of proper proportions, actually extinguishes all sparks, and thereby prevents any fire being thrown, yet, in some States, and in the jurisdiction of the Forest Reserve, there are statutory requirements calling for the use of screens of foraminous material, of specified mesh or opening, interposed within the smoke box, in the path of the products of combustion, and owing to the fact that the openings between the vanes of the gyrus are many times larger than those in even the largest screens used, and in order to protect users against errors of judgment, in litigated questions, and meet the statutory requirements above noted, when the gyrus is used, it becomes desirable to apply some description of screen in connection therewith. To this end, as specified in my Letters Patent No. 951,994 aforesaid, any suitable known form of screen may be used, and be applied in any location within the smoke box, in the path of the products of combustion, between their exit from the boiler tubes and their entrainment between the gyrus vanes. A convenient application is shown in Figs. 11 and 12, in which a screen of foraminous material, 25, in the form of a frustum of a cone, is located around the gyrus vanes, 28, and is attached, at its top and bottom, to the upper and lower gyrus rings, 29 and 30, respectively. The screen is preferably, as shown, set at some little distance from the exterior of the gyrus vanes, in order to protract the travel of the products of combustion, by inducing a circulation of said products, exterior to the gyrus after passing through it, and also that a practically uniform vacuum may be induced through the screen at all points, thereby preventing clogging and unequal wear of the vanes. This form of screen, as shown in Figs. 11 and 12, is also equally applicable in connection with any of the other forms of vanes herein set forth, or modifications thereof. In some instances, it may be applied only around the upper or the lower portions of the gyrus, above or below the separator plate, as preferred.

The generic function of the gyrus, obtained through the vacuum induced by the blast jet, is to entrain the products of combustion between the vanes of the gyrus; to rapidly revolve them within the gyrus; and, through the centrifugal force thus imparted, to separate the solid from the gaseous products; the solid products having their travel materially prolonged by the combined structural and functional elements herein set forth and being thereby gyrated, disintegrated, and entirely extinguished, prior to their ejection from the stack.

The specific function of the structural modifications herein set forth, is to meet special conditions of locomotive construction and operation, and to provide such means for the proper entrainment of the products of combustion within the gyrus as will, under such special conditions, where it is not at all times feasible to obtain proper circulation exterior to the gyrus, assure proper revolution of the products of combustion within the gyrus, thus preventing unequal wear, and causing a thorough separation of the solid from the gaseous products, and, at the same time, enhancing the gyration of. the solid products and insuring their thorough disintegration and extinguishment prior to their ejection.

Variations in the form, number, angle, and position of the several members of the gyrus and its adjacent members and connections, and in the relative location thereof, may be made, in the discretion of the skilled constructor, without departure from the spirit or functional and operative principle of my invention. I do not therefore limit myself to the specific construction herein shown and described.

My invention is applicable, in the manner herein set forth, to any and all types of steam boilers in which a fluid pressure jet is used for the creation of draft.

I claim as my invention and desire to secure by Letters Patent:

1. The combination, with a locomotive smoke box, stack, and exhaust pipe, of a separator or "gyrus", consisting of a circumferential series of nested vanes of curved form, having their terminal surfaces tangential to different circles eccentrically centered with the axis of the "gyrus", and in a series concentric therewith, directly interposed between the exhaust pipe and stack and connected thereto.

2. In a locomotive smoke box, a "gyrus" concentrically intercalated between the exhaust pipe and stack, comprising a circumferential series of nested vanes, having their terminal surfaces curved and disposed interiorly and exteriorly approximately tangential to opposed circular arcs, eccentrically centered with respect to the axis of the gyrus, and interposed in the path of the products of combustion from the smoke box to the stack.

3. The combination, with a locomotive smoke box, and stack, of an exhaust pipe, and an intercalated "gyrus" concentric therewith, comprising a plurality of nested vanes forming passages for the entrainment of the products of combustion, having the terminals of their interior and exterior openings disposed in reverse directions, and tangential to opposed circular arcs eccentrically centered with respect to the axis of the gyrus, and interposed in the path of the products of combustion from the smoke box to the stack.

4. The combination, with a locomotive smoke box, of a stack, an exhaust pipe, and a "gyrus", comprising a circumferential series of upwardly flared and horizontally incurvate recurvate and nested vanes, having their terminals tangential to opposed circular arcs eccentrically centered with respect to the axis of the gyrus, and concentrically located in relation to, and connected with, the stack and exhaust pipe respectively.

5. The combination, with a locomotive smoke stack, and exhaust pipe, of an intercalated "gyrus" concentric therewith, comprising a series of nested and curved vanes circumferentially disposed with their terminal surfaces tangential in different horizontal planes to circles which are eccentric to the axis of the gyrus, said vanes being vertically disposed in conoid form.

6. The combination, with a locomotive smoke stack, of an exhaust pipe, and an intercalated "gyrus" concentric therewith, comprising a circumferential series of nested and upwardly flared vanes of curved form, having their interior portions arranged as converging spirals and uniformly tangential to circles in different horizontal planes and eccentrically centered with respect to the axis of the gyrus.

7. The combination, with a locomotive smoke stack, of an exhaust pipe, and an interposed "gyrus" concentric therewith, comprising a plurality of curved vanes upwardly flared and nested in circumferential series and so disposed that the terminals of the openings therethrough, formed thereby, are interiorly uniformly tangential in direction to different circles in superposed planes, eccentrically centered with respect to its axis.

8. The combination, with a locomotive smoke stack, of an exhaust pipe, and a directly interposed frusto-conical "gyrus" concentric therewith, comprising a circumferential series of nested vanes forming terminally incurvate passages, so disposed that they deliver the products of combustion entrained therethrough at angles uniformly tangential to different circles in the same horizontal plane and to different circles in superposed planes, eccentrically centered with respect to its axis.

9. The combination, with a locomotive smoke box, of a stack, an exhaust pipe, an intercalated "gyrus" concentric therewith, comprising a plurality of curved vanes nested circumferentially, disposed uniformly tangentially to circles eccentrically centered with respect to its axis, and a foraminous screen surrounding the openings of said gyrus.

10. The combination, with a locomotive smoke stack, of an exhaust pipe, an intercalated "gyrus" concentric therewith, comprising a plurality of members presenting incurvate passages having their interior terminals disposed along converging spirals, whereby the gases are discharged at uniform angles, and a foraminous screen exterior to, and inclosing, said passages.

11. The combination of a smoke box connected with the fire tubes of a boiler, a stack connected thereto, a blast pipe discharging into said stack for the purpose of creating a vacuum within the smoke box and causing the induction of the products of combustion into the smoke box and their discharge therefrom and final ejection through the stack thereby, and a foraminous screen, with a frusto-conical "gyrus" comprising a circumferential series of nested vanes, disposed as herein set forth, intervening between and concentrically intercalated with, the blast pipe and stack, for causing gyration to the products of combustion within the "gyrus."

JOHN PLAYER.

Witnesses:
 J. SNOWDEN BELL,
 E. M. HOPLER.